(12) United States Patent
Pyo

(10) Patent No.: US 11,880,240 B2
(45) Date of Patent: Jan. 23, 2024

(54) DISPLAY DEVICE

(71) Applicant: LG ELECTRONICS INC., Seoul (KR)

(72) Inventor: Jonggil Pyo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 17/424,835

(22) PCT Filed: Jan. 25, 2019

(86) PCT No.: PCT/KR2019/001107
§ 371 (c)(1),
(2) Date: Jul. 21, 2021

(87) PCT Pub. No.: WO2020/153521
PCT Pub. Date: Jul. 30, 2020

(65) Prior Publication Data
US 2022/0139275 A1  May 5, 2022

(51) Int. Cl.
*G06F 1/16* (2006.01)
*H04M 1/02* (2006.01)
*G09F 9/30* (2006.01)

(52) U.S. Cl.
CPC ........ *G06F 1/1652* (2013.01); *H04M 1/0268* (2013.01); *F16M 2200/061* (2013.01); *G09F 9/301* (2013.01)

(58) Field of Classification Search
CPC ..... G06F 1/1652; G09F 9/301; H05K 5/0017; H05K 5/0217; F16M 2200/061; H04M 1/0268
See application file for complete search history.

(56) References Cited

U.S. PATENT DOCUMENTS 9,098,241 B1 * 8/2015 Cho ................. B65H 75/28
10,111,344 B2 * 10/2018 Han ................. H05K 5/03
(Continued)

FOREIGN PATENT DOCUMENTS

CN        107170373        9/2017
CN        107170373 A  *  9/2017
(Continued)

OTHER PUBLICATIONS

European Patent Office Application Serial No. 19911819.1, Search Report dated Oct. 28, 2022, 11 pages.
(Continued)

*Primary Examiner* — Nidhi Thaker
(74) *Attorney, Agent, or Firm* — LEE, HONG, DEGERMAN, KANG & WAIMEY

(57) ABSTRACT

The present embodiment may comprise: a display module; a link assembly connected to the display module; and a rotation mechanism connected to the link assembly so as to rotate the link assembly. In addition, the link assembly may comprise: a pair of links; and a link joint to which each link, of the pair of links, is rotatably connected. At least one link, of the pair of links, may comprise: an arm from which at least one gear coupling part protrudes; a gear; and a fastening member for fastening the gear to the gear coupling part. A first fastening hole may be formed in the gear coupling part; a second fastening hole, matching with the first fastening hole, may be formed in the gear; and the fastening member may couple the gear to the gear coupling part by being inserted in the first fastening hole and the second fastening hole.

4 Claims, 12 Drawing Sheets

(56) References Cited

U.S. PATENT DOCUMENTS

| | | | | |
|---|---|---|---|---|
| 10,362,690 B2* | 7/2019 | Han | .................... | G02F 1/1333 |
| 10,410,549 B1* | 9/2019 | Kim | .................... | G06F 1/1601 |
| 10,534,402 B1* | 1/2020 | Kim | .................... | H05K 5/0217 |
| 10,571,969 B2* | 2/2020 | Yeh | .................... | G06F 1/1601 |
| 10,582,622 B2* | 3/2020 | Kim | .................... | G09F 9/301 |
| 10,845,696 B2* | 11/2020 | Song | .................... | H04N 9/3173 |
| 10,877,525 B2* | 12/2020 | Kang | .................... | G06F 1/1652 |
| 10,890,947 B2* | 1/2021 | Choi | .................... | H05K 5/0017 |
| 10,976,778 B2* | 4/2021 | Pyo | .................... | G09F 9/301 |
| 11,127,323 B2* | 9/2021 | Kim | .................... | G06F 1/1652 |
| 11,403,974 B2* | 8/2022 | Kim | .................... | G09F 9/301 |
| 11,510,327 B2* | 11/2022 | Liu | .................... | H05K 5/0217 |
| 2012/0002357 A1 | 1/2012 | Auld et al. | | |
| 2013/0127799 A1* | 5/2013 | Lee | .................... | G06F 1/1652 |
| | | | | 345/204 |
| 2016/0374228 A1* | 12/2016 | Park | .................... | G09F 9/301 |

FOREIGN PATENT DOCUMENTS

| | | | | |
|---|---|---|---|---|
| JP | 5950140 | | 7/2016 | |
| KR | 10-2011-0082941 | | 7/2011 | |
| KR | 10-2016-0150253 | | 12/2016 | |
| KR | 10-2017-0006012 | | 1/2017 | |
| WO | 2017209744 | | 12/2017 | |
| WO | WO-2017209744 A1 * | 12/2017 | ....... | G02F 1/133308 |

OTHER PUBLICATIONS

PCT International Application No. PCT/KR2019/001107, International Search Report dated Oct. 23, 2019, 4 pages.

* cited by examiner

[Fig. 1]
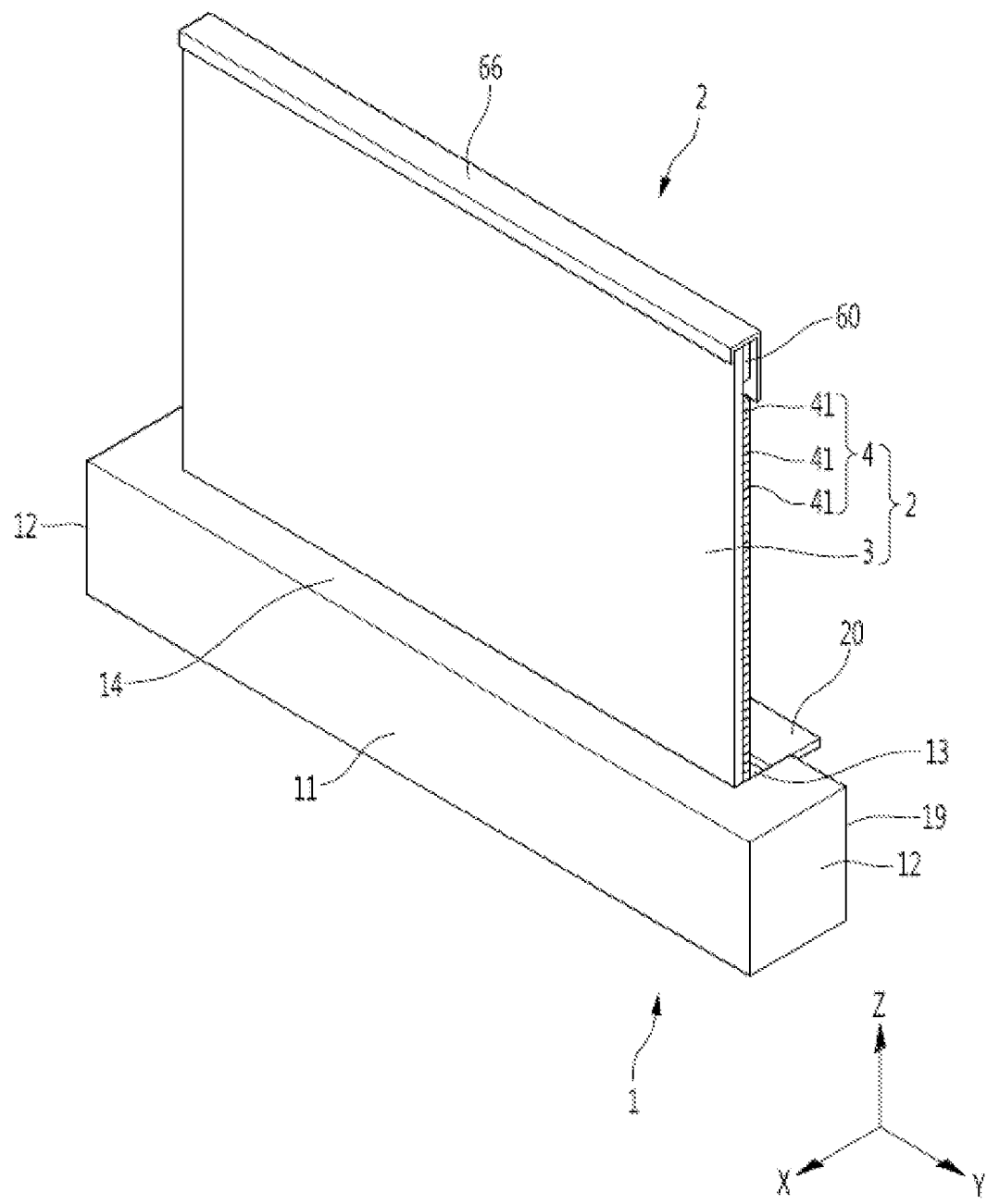

[Fig. 2]
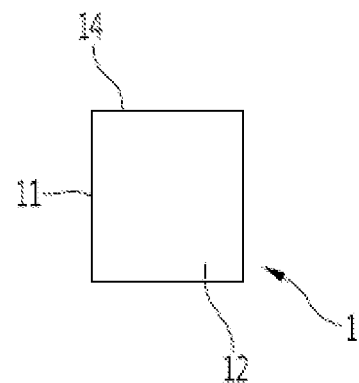
[Fig. 3]
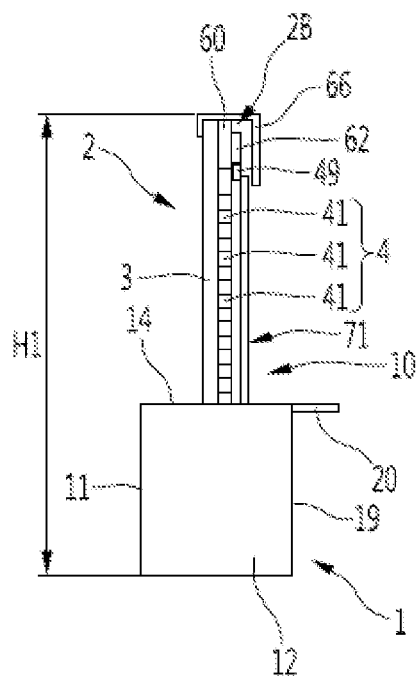

[Fig. 4]
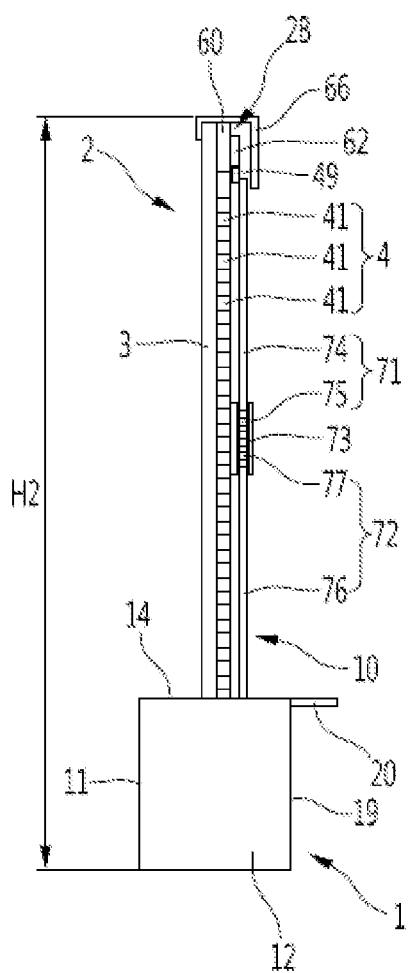

[Fig. 5]
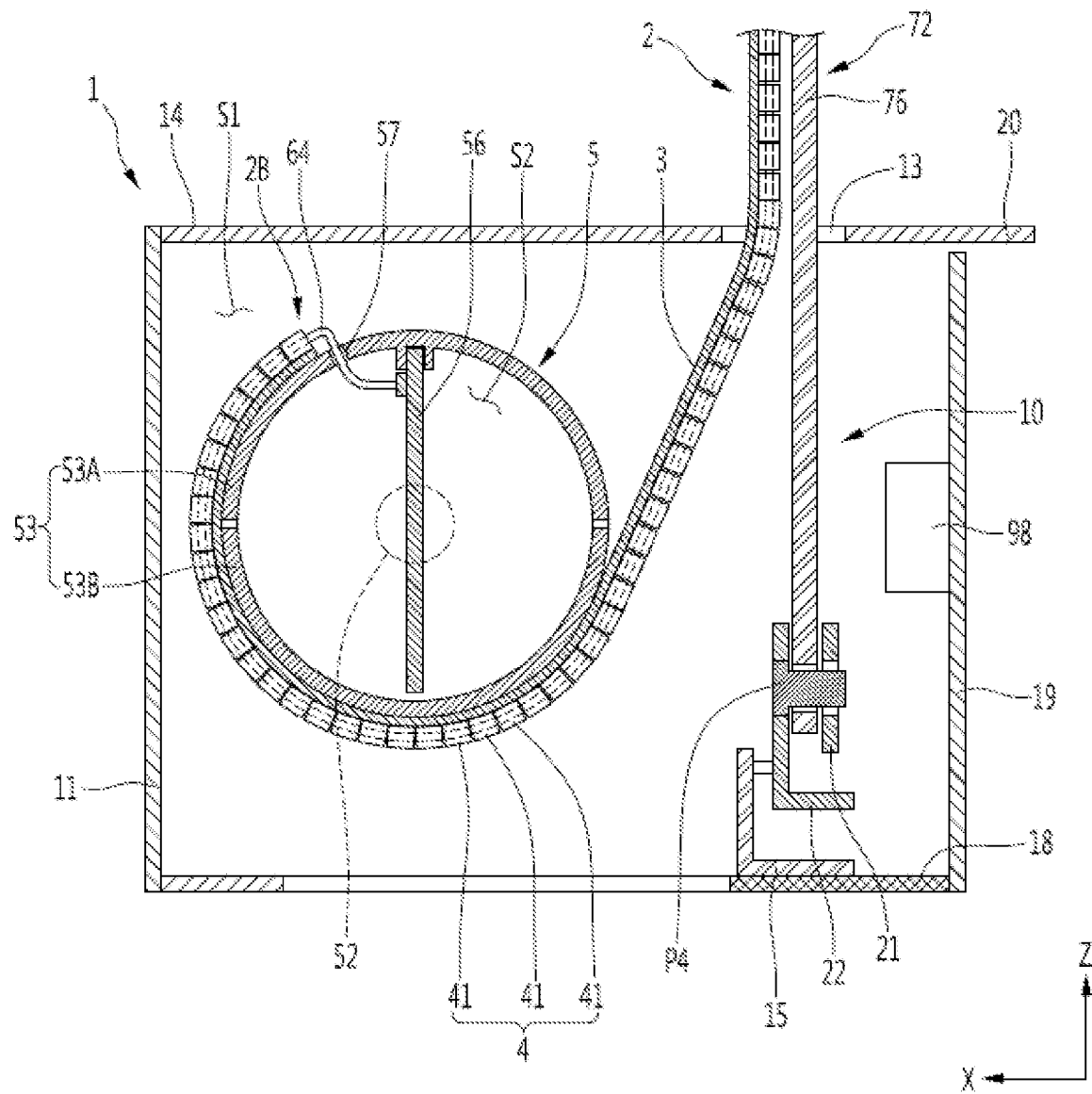

[Fig. 6]
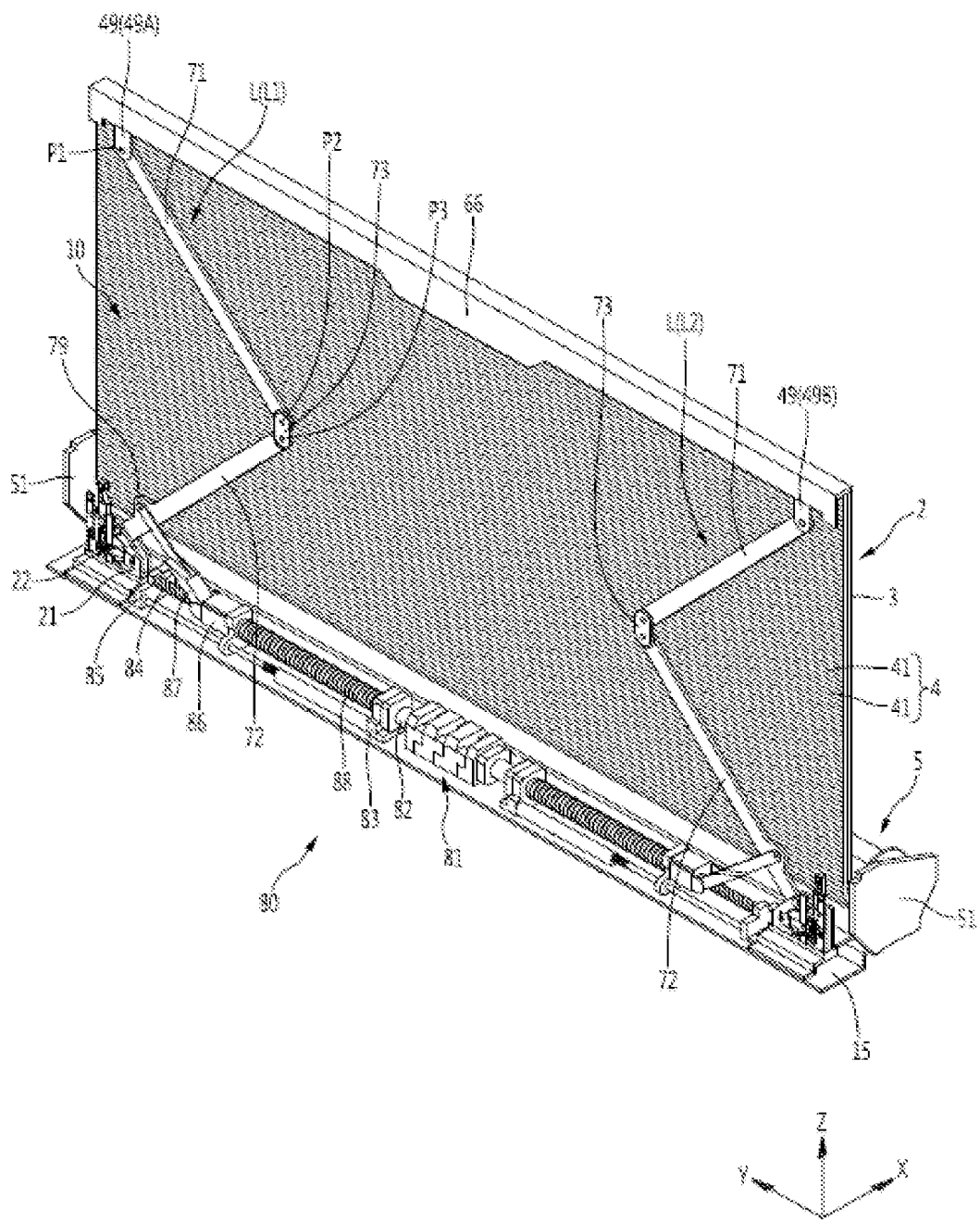

[Fig. 7]
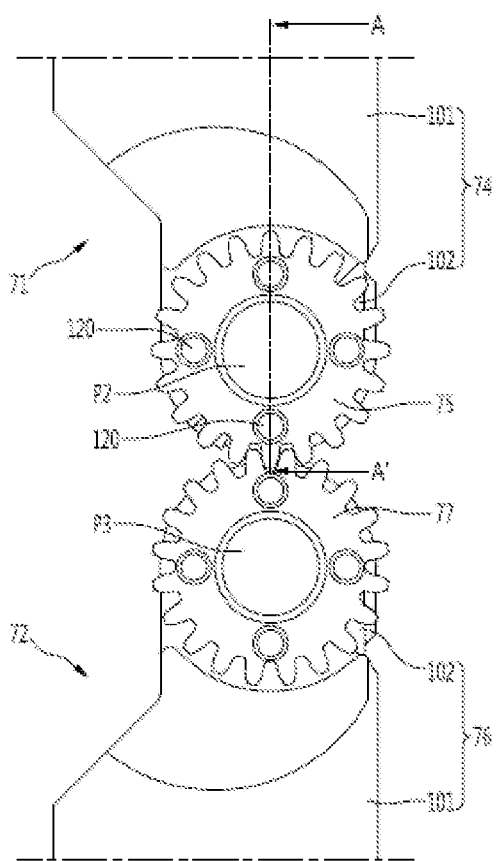

[Fig. 8]
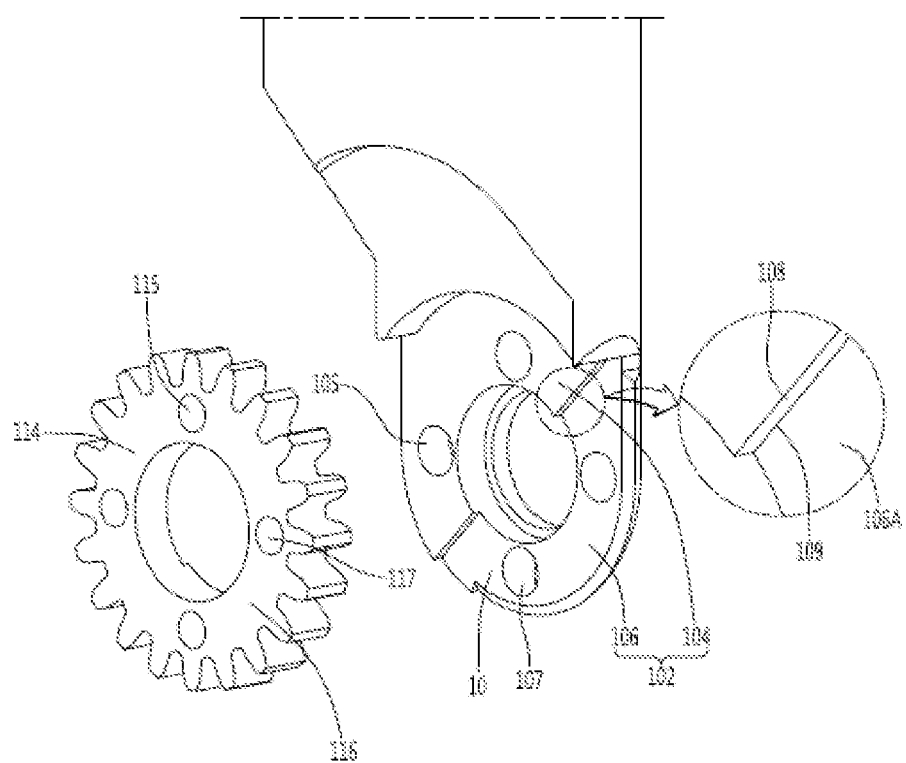

[Fig. 9]
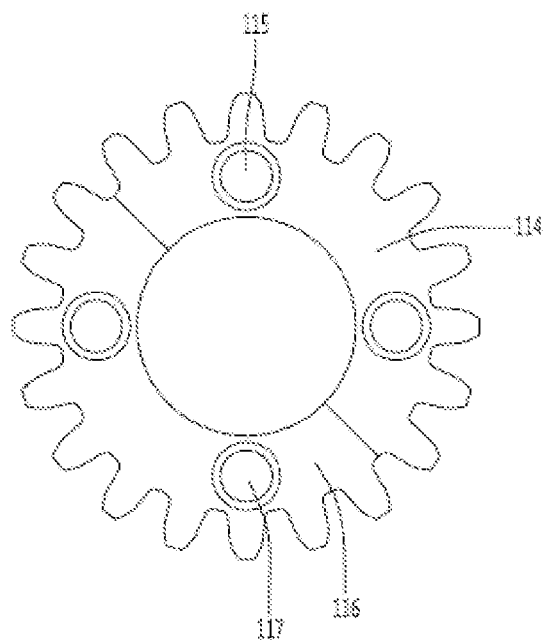

[Fig. 10]
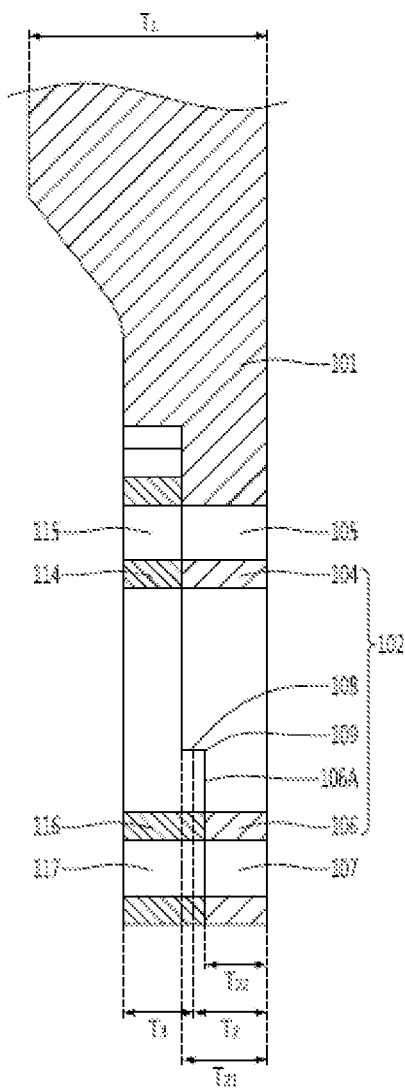

[Fig. 11]
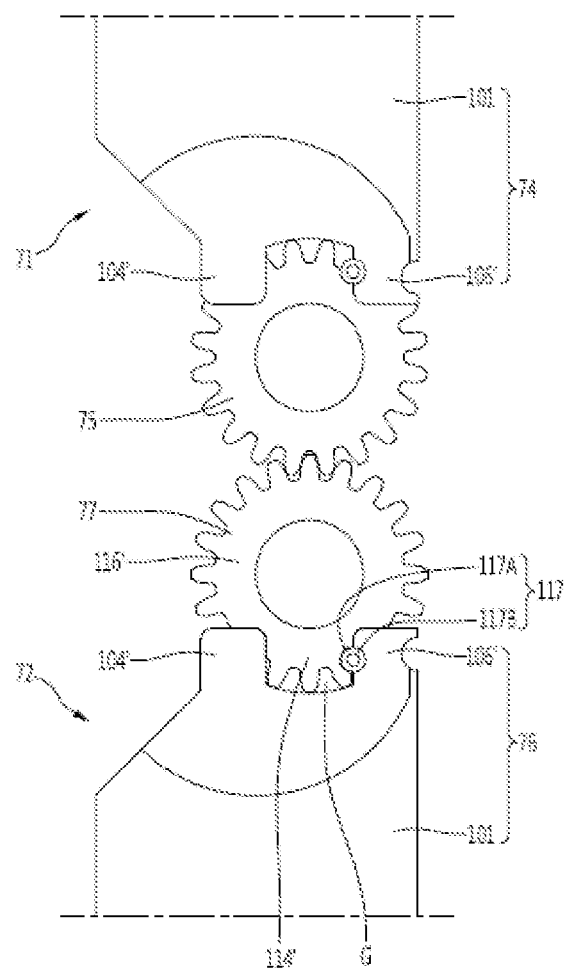

[Fig. 12]
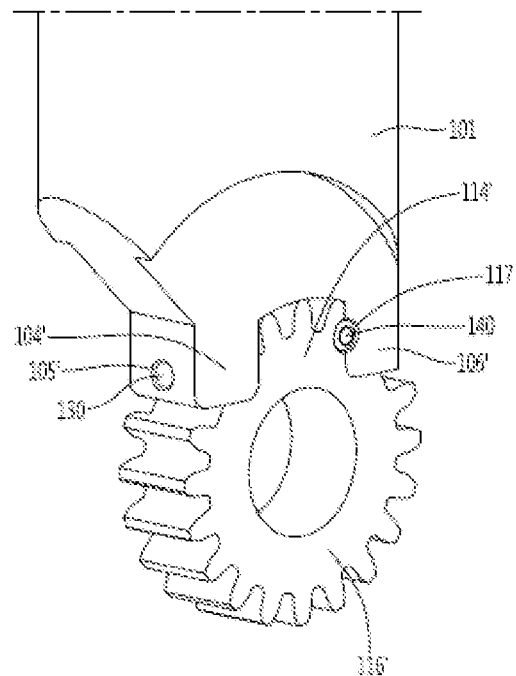

[Fig. 13]
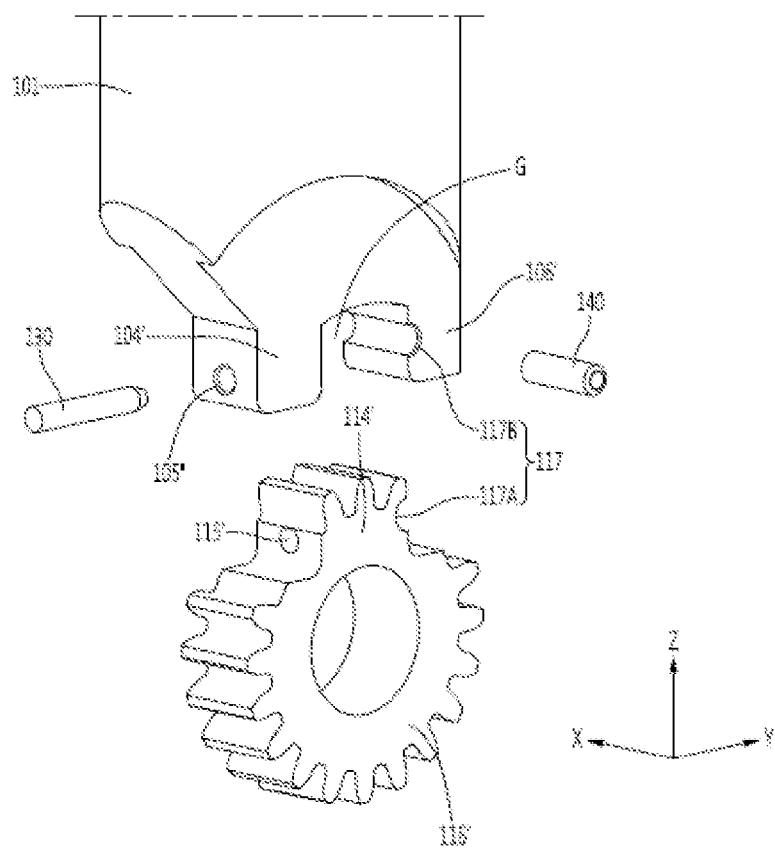

DISPLAY DEVICE

CROSS-REFERENCE TO RELATED APPLICATIONS

This application is the National Stage filing under 35 U.S.C. 371 of International Application No. PCT/KR2019/001107, filed on Jan. 25, 2019, the contents of which are hereby incorporated by reference herein its entirety.

TECHNICAL FIELD

The present disclosure relates to a display device.

BACKGROUND ART

As the information society develops, the demand for a display device has been increased in various forms. Recently, various display devices, such as a liquid crystal display device (LCD), a plasma display panel (PDP), an electro-luminescent display (ELD), or a vacuum fluorescent display (VFD) have studied and used.

When compared to a liquid crystal display device, a display device using an OLED LCD may represent more excellent characteristics in brightness and viewing angle and may be implemented in an ultra-thin form as the liquid crystal display device does not require the backlight unit.

The display device may include a flexible display panel wound on or released from the roller. Korean Unexamined Patent Publication 10-2017-0062342 A (Jun. 7, 2017) discloses a display device having a link to operate such a display panel.

Such a display device has gears are integrally formed with a pair of links, which are positioned at a rear portion of the display panel, while being engaged with the links, respectively, respectively. As the spacing between the pair of links is varied, the display panel is wound around the roller or unwound from the roller.

DISCLOSURE

Technical Problem

According to the display device of the related art, since the gears are formed integrally with the links, the machining of the gears are difficult, and the links require the higher manufacturing costs. In addition, when the links are fully formed of a stiffness material to ensure the stiffness of the gears, the material costs of the link may be increased.

In addition, according to the display device of the related art, when the gear is broken, the link has to be replaced, and the repair costs of the link are increased.

The present disclosure is to provide a display device capable of reducing the manufacturing costs of a link, and representing higher stiffness in the joint part between links.

The present disclosure is to provide a display device including a gear coupled to an arm with higher reliability.

Technical Solution

According to an embodiment of the present disclosure, a display device may include a display module, a link assembly coupled to the display module, and a rotating mechanism coupled to the link assembly to rotate the link assembly. In addition, the link assembly may include a pair of links, and a link joint to which the pair of links are rotatably coupled. At least one of the pair of links includes an arm from which at least one gear coupling part protrudes, a gear, and a fastening member to fasten the gear to the gear coupling part. A first fastening hole may be formed in the gear coupling part, and a second fastening hole matched with the first fastening hole may be formed in the gear. The fastening member may be inserted into the first fastening hole and the second fastening hole to fasten the gear to the gear coupling part.

For one example, the gear coupling part may include a first coupling part and a second coupling part extending from the first coupling part and thinner than the first coupling part. The gear may include a first gear part facing the first coupling part and a second gear part facing the second coupling part and thicker than the first gear part. The first coupling part may have a stop surface to which the second gear part is locked in the rotational direction.

One end of the stop surface may make contact with one surface, which faces the second gear part, of the second coupling part.

The first fastening hole may be spaced apart from the stop surface. The first fastening hole may be formed in each of the first coupling part and the second coupling part.

For another example, a pair of gear coupling parts may be formed in the arm, and a gap may be formed between the pair of gear coupling parts.

The fastening member may include a shaft press-fitted between any one of the pair of gear coupling parts and the gear and fastened. The shaft may extend in a direction in which the pair of gear coupling parts are spaced apart from each other.

In addition, the fastening member may include a pin press-fitted between another of the pair of gear coupling parts and the gear. The pin may extend in the direction perpendicular to a direction Y in which the pair of gear coupling part are spaced apart from each other.

The first fastening hole may be formed in any one of the pair of gear coupling parts.

The gear may include a first gear part received in the gap and having a second fastening hole matched with the first fastening hole, and a second gear part integrally formed with the first gear part and positioned outside the gap.

The shaft may be press-fitted into the first fastening hole and the second fastening hole. The shaft may extend in a direction in which the pair of gear coupling parts are spaced apart from each other.

Grooves are formed in another of the pair of gear coupling parts and the first gear part corresponding to each other to form a pin hole, and the pin may be press-fitted into the pin hole.

The pin may extend in the direction X perpendicular to the direction Y in which the pair of gear coupling parts are spaced apart from each other.

Advantageous Effects

According to an embodiment of the present disclosure, the link may include the arm and the gear, and the arm and the gear are coupled to each other through a fastening member to sufficiently ensure stiffness. When the link is operated, the shaking of the link may be minimized.

In addition, when the gear is integrally formed with the arm, the arm may be easily formed. When the arm and the gear include mutually different materials, the weight of the arm may be reduced, and the material costs of the arm may be saved.

Further, when the gear is abraded as the display module is used for a long term, a new gear may be coupled to the arm in place of the abraded gear. Accordingly, the service cost may be more reduced as compared to when the whole link is replaced.

Further, the gear is bi-directionally fixed by the shaft and the pin, thereby minimizing the distortion of the gear. In addition, the gear may be sustained by the arm with higher reliability.

Further, in the state that the second gear face-to-face makes contact with the sop surface of the first coupling part, the first coupling part is fastened to the second gear through the fastening member. Accordingly, the fastening of the fastening member may be easier, and the time taken to assemble the link may be minimized.

DESCRIPTION OF DRAWINGS

FIG. 1 is a perspective view of a display device according to an embodiment of the present disclosure;

FIG. 2 is a side view of a display module covered by a housing according to an embodiment of the present disclosure;

FIG. 3 is a side view of the display module when a portion of a display module is lifted from a housing illustrated in FIG. 2;

FIG. 4 is a side view of a display module when the display module is limited to the maximum height according to an embodiment of the present disclosure;

FIG. 5 is a sectional view of an inner part of the housing according to an embodiment of the present disclosure;

FIG. 6 is a perspective view of a display module while a lift module moves up the display module according to an embodiment of the present disclosure;

FIG. 7 is a rear view illustrating an inner part of a link joint as one example of a link assembly according to an embodiment of the present disclosure;

FIG. 8 is an exploded perspective view illustrating a first link or a second link illustrated in FIG. 7;

FIG. 9 is a front view of a gear illustrated in FIG. 8;

FIG. 10 is a sectional view taken along line A-A' illustrated in FIG. 7.

FIG. 11 is a rear view illustrating an inner part of a link joint as another example of a link assembly according to an embodiment of the present disclosure;

FIG. 12 is a perspective view illustrating a first link or a second link illustrated in FIG. 11; and FIG. 13 is an exploded perspective view illustrating a first link or a second link illustrated in FIG. 12.

BEST MODE

[Mode for Invention]

Hereinafter, an embodiment of the present disclosure will be described with reference to accompanying drawings in detail.

FIG. 1 is a perspective view of a display device according to an embodiment of the present disclosure, FIG. 2 is a side view of a display module covered by a housing according to an embodiment of the present disclosure, FIG. 3 is a side view of the display module when a portion of a display module is lifted from a housing illustrated in FIG. 2, FIG. 4 is a side view of a display module when the display module is limited to the maximum height according to an embodiment of the present disclosure, and FIG. 5 is a sectional view of an inner part of the housing according to an embodiment of the present disclosure.

A display device includes a housing 1 and a display module 2 that is introduced into the housing 1 or withdrawn out of the housing 1.

The display module 2 may include a display panel 3 and a display cover 4.

The display device may further include a roller 5. The display module 2 may be wound around the roller 5 or may be unwound from the roller 5. The roller 5 may be provided inside the housing 1.

The display device may include a driving mechanism 10 (see FIGS. 3 to 6) to operate the display module 2. The driving mechanism 10 may be coupled to the display module 2.

The display module 2 may be wound around the roller 5 or unwound from the roller 5 by the driving mechanism 10, while being coupled to the roller 5 and the driving mechanism 10.

One side of the display module 2 may be a first coupling part 2B coupled to the roller 3 (see FIG. 5), and an opposite side of the display module 2 may be a second coupling part 2B coupling to the driving mechanism 10 (see FIGS. 3 and 4). The first coupling part 2B and the second coupling part 2B may be positioned at opposite sides to each other in a longitudinal direction of the display module 2.

The operation of the display module 2 may be defined as moving the position of the second coupling part 2B by the driving mechanism 10. The driving mechanism 10 may adjust the area, which is exposed to the outside, of the display panel 3 by changing the height of the second coupling part 2B.

The display device may have a thickness in a front-rear direction X, a length in a left-right direction Y, and a height in a vertical direction Z.

The housing 1 may include the assembly of a plurality of members. The housing 1 may be formed therein with a space S1 (see FIG. 5) in which the roller 5 is received. The display module 2 may be received together with the roller 5 in the space S1.

The housing 1 may include a front cover 11 to cover the roller 5 in front of the roller 5. The front cover 11 may form a front outer appearance of the housing 1.

The housing 1 may further include at least one side cover 12 to cover the roller 5 at the side of the roller 5. The side cover 12 may form a side outer appearance of the housing 1. A pair of side covers 12 may be provided and may include a left cover positioned at the left side of the roller 5 and a right cover positioned at the right side of the roller 5.

The housing 1 may be formed therein with an opening 13 through which the display module 2 passes. The opening 13 may be formed in an upper portion of the housing 1. The opening 13 may be formed in the upper portion of the housing 1 such that the opening 13 is open in a vertical direction.

The housing 1 may further include a top cover 14 to form an outer appearance of a top surface of the housing 1. The opening 13 may be formed in the top cover 14 to be open in the vertical direction.

The housing 1 may further include a lower frame 18. The lower frame 18 may be disposed in a horizontal direction between the pair of side covers 12. The lower frame 18 may be coupled to the pair of side covers 12.

The housing 1 may further include a back cover 19 to cover a portion of the driving mechanism 10, which is received in the space S1 of the housing 1. The back cover 19 may be disposed in the horizontal direction between the pair of side covers 12. The lower frame 18 may be coupled to the pair of side covers 12.

The display device may include a door 20 to open or close the opening 13. The door 20 may be disposed in the housing 1. The door 20 may be disposed retractably in the horizontal direction or rotatably in the vertical direction at the top cover 13.

The door 20 may be moved to a position of opening the opening 13 or rotated before at least a portion of the display module 2 is moved up from the housing 1.

The door 20 may be positioned at the opening 13 and may cover the opening 13 when an entire portion of the display module 2 has been completely inserted into the housing 1.

The display module 2 may be wound around the roller 5 such that the entire portion of the display module 2 may be received in the space S1. In addition, a portion of the display module 2 may be unwound from the roller 5 such that the display module 2 is withdrawn out of the space S1.

The thickness of the display module 2 may be thinner than the thickness of the housing 1. The length of the housing 1 in the horizontal direction may be longer than the length of the display module 2 in the horizontal direction. When the display module 2 is spread, the height of the display module 2 (the height of the upper end of the display module) may be higher than the height of the housing 1 (that is, the height of the upper end of the housing).

As illustrated in FIG. 2, the entire portion of the display module 2 may be inserted into and received in the housing 1. As illustrated in FIG. 3, only a portion of the display module 2 may be moved up to a predetermined height H1 from the top surface of the housing 1. As illustrated in FIG. 4, the display module 2 may be moved up to the maximum height H2.

The display module 2 may be coupled to a roller body 53. When the roller body 53 rotates about the rotational shaft 52, the display module 2 may be wound around or unwound from the roller body 53 while being coupled to the roller body 53.

The display panel 3 may display an image through the front surface thereof. A region of the display panel 3, which is positioned at an outer portion of the housing 1, may be defined as an active region allowing a user to view the image from the outside. A region of the display panel 3, which is positioned in the space S1 of the housing 1, may be an inactive region allowing the user not to view the image from the outside.

Preferably, the display panel 3 has elasticity allowing bending or rolling like an OLED. In this case, the display panel 3 may be a flexible display panel.

The display cover 4 may be disposed on the back surface of the display panel 3 or may cover the back surface of the display panel 3. The display cover 4 may be a panel supporter to support the display panel 3.

The display cover 4 may include a plurality of supporters 41 to support the display panel 3. Each of the plurality of supporters 41 may extend in the horizontal direction at the rear portion of the display panel 3.

The plurality of supporters 41 may be attached to the back surface of the display panel 3. An adhesive member may be provided on the back surface of the display panel 3, and each of the plurality of supports 41 is attached to the adhesive member to be fixed to the display panel 3. The adhesive member may include a double-sided tape or may include an adhesive interposed between the display panel 3 and the supporter 41. The plurality of supporters 41 may be attached to the back surface of the display panel 3 through the adhesive member. The adhesive member may fix the back surface of the display panel 3 to the front surface of the supporter 41.

The plurality of supporters 41 may be arranged to be stacked in the vertical direction Z when the display panel 3 is upright. An upper end of the supporter, which is provided at a lower position, of the plurality of supporters 41 may make contact with a lower end of another supporter, which is positioned above the supporter. In detail, the supporter positioned at the lower position may support the supporter at the upper position.

When the display panel 3 is wound around the roller 5, the plurality of supporters 41 may be spread. The plurality of supporters 41 may be wound around the roller 5 together with the display panel 3 and the adhesive member while being attached to the display panel 3 by the adhesive member 42.

Each of the plurality of supporters 41 may have the shape of a bar extending in the horizontal direction Y. The sectional shape of each supporter 41 has a rectangular shape extending in the vertical direction.

The roller 5 may be disposed rotatably in the housing 1. The roller 5 may be rotatably received inside the housing 1. The housing 1 may have a roller supporter 51 (see FIG. 6) to rotatably support the roller 5. A pair of roller supporters 51 may be provided in the housing 1. The roller 5 may be interposed between the pair of roller supporters 51 and may be rotatably supported by the pair of roller supporters 51.

[73] The roller 5 may include a rotational shaft 52 (see FIG. 5) rotatably supported by the roller supporter 51.

The roller 5 may include a roller body 53 (see FIG. 5) around which the display module 2 is wound. The roller body 53 may be coupled to the rotational shaft 52 or may be integrated with the rotational shaft 52. The roller body 53 may be rotated about the rotational shaft 52.

The roller 5 may be formed therein with an inner space S2. The roller body 53 may include an assembly of a plurality of members. The roller 5 may have the shape of a hollowed cylinder having the inner space S2 therein. The roller 5 may include the assembly of a first roller body 53A and a second roller body 53B. The inner space S2 may be formed between the first roller body 53A and the second roller body 53B.

A timing controller board 56 (see FIG. 5) may be received in the inner S2 of the roller 5. The timing controller board 56 may be connected to a source printed circuit board 62 (see FIG. 4) to be described below and a cable 64.

The roller 5 is formed therein with a cable through hole 57 (see FIG. 5) through which the cable 64 passes. The cable 64 may be connected to the timing controller board 56 in the state that the cable 64 passes through the cable through hole 57. The cable through hole 57 may be radially formed through one side of the roller body 53.

The display device may include a connecting bar 60 as illustrated in FIGS. 3 and 4. The display device may further include a source PCB 62 as illustrated in FIGS. 3 and 4. In addition, the display device may further include a top case 66.

The connecting bar 60 may be coupled to at least one of the display panel 3 and the display cover 4. The connecting bar 60 may be coupled to the top case 66.

The display module 2 may be defined as including the display panel 3, the display cover 4, and the connecting bar 60, and the connecting bar 60 may be a second coupling part 2B.

The source PCB 62 may be disposed on the connecting bar 60. The source PCB 62 may include signal wires to transmit digital video data and timing control signals received from the timing controller board 56. The source PCB 62 may be connected to the display panel 3 by a source chip on film (COF) (not illustrated). The source COF coupled to one side of the source PCB 62 may extend to the active region of the display panel 3 and thus may be coupled to the display panel 3. The COF may be coupled to an upper portion of the display panel 3.

The cable 64 may connect the source PCB 62 to the timing controller board 56. The cable 64 may have one end electrically connected to the source PCB 62 and an opposite end electrically connected to the timing controller board 56.

The cable 64 may include a cable bendable according to the shape of the display cover 4. In detail, the cable 64 may be an FFC cable or an FPCB.

The cable 64 may be disposed to pass through the plurality of supporters 41. The cable 64 may be disposed to pass through the opening 43 formed in the plurality of supporters 41.

The top case 66 may be disposed to surround the second coupling part 2B. The top case 66 may be disposed while surrounding the upper portion of the display module 2 or may be disposed while surrounding the coupling part 2B and the source PCB 62. The top case 66 may be coupled to the connecting bar 60 or may be coupled to the upper portion of the display module 2.

The second coupling part 2B and the source PCB 62 may be positioned inside the top case 66, and may be protected by the top case 66.

Referring to FIG. 4, the driving mechanism 10 may include a pair of links 71 and 72. The driving mechanism 10 may further include a link joint 73 rotatably coupling the pair of links 71 and 72 to each other.

The pair of links 71 and 72 may include a first link 71 and a second link 72. The first link 71 and the second link 72 may be coupled to each other such that, when any one of the first link 71 and the second link 72 is rotated, a remaining one is rotated together.

The first link 71 may be rotatably coupled to the display module 2. The first link 71 may be directly coupled to the display module 2, or may be coupled to the display module 2 through an upper bracket 49.

Each of the first link 71 and the second link 72 may be rotatably coupled to the link joint 73.

The second link 72 may be rotatably coupled to the housing 1. The second link 72 may be directly coupled to the housing 1, or may be coupled to the housing 1 through link supporters 21 and 22.

The first link 71 may be a driven link. When the second link 72 is rotated, the first link 71 may move the second coupling part 2B of the display module 2 while rotating about the display module 2, especially, the second coupling part 2B, relatively to the second link 72 When the second link 72 is rotated, the first link 71 may move the connecting bar 60, and the display module 2 may be unwound from the roller 5 or wound around the roller 5 when moving the connecting bar 60.

The first link 71 may be rotatably coupled to the connecting bar 60, or may be rotatably coupled to the upper bracket 49 coupled to the connecting bar 60. One side of the upper bracket 49 may be fastened to the connecting bar 60 with a fastening member such as a screw.

The first link 71 may be coupled to the connecting bar 60 or the upper bracket 49 through a hinge pin P1.

An opposite side of the first link 71 may be rotatably coupled to the arm joint 73. An opposite side of the first link 71 may be rotatably coupled to the arm joint 73 through a hinge pin P2.

The second link 72 may be a driving link to rotate the first link 71. The second link 72 may be coupled to the first link

71 to rotate the first link 71. The second link 72 may be rotatably coupled to the arm joint 73. One side of the second link 72 may be rotatably coupled to the arm joint 73 through a hinge pin P3.

An opposite side of the second link 72 may be rotatably supported by the housing 1. The second link 72 may be rotatably coupled to a lift module supporter 15 or may be rotatably coupled to the link supports 21 and 22 which are separately provided.

The lift module supporter 15 may be disposed on the lower frame 18 (see FIG. 5), and may be supported by the lower frame 18.

The link supporters 21 and 22 may be disposed on the lift module supporter 15 (see FIG. 5), to rotatably support the second link 72 while being upright perpendicularly to the lift module supporter 15

The second link 72 may be coupled to a hinge pin P4 (see FIG. 5), which serves as a rotational center axis of the second link 72, and the second link 72 may be rotated about the hinge pin P4. The hinge pin P4 may be a horizontal shaft coupled to the second link 72, and may longitudinally extend in the front-rear direction. The hinge pin P4 may be fastened to the second link 72 to be rotated integrally with the second link 72, when the second link 72 is rotated.

The hinge pin P4 is manufactured separately from the second link 72 and then coupled to the second link 72, or may integrally protrude from the second link 72.

The hinge pin P4 may be rotatably supported by the link supporters 21 and 22. A pair of link supporters 21 and 22 may be provided, and the hinge pin P4 may be rotatably supported by the pair of link supporters 21 and 22. The pair of link supporters 21 and 22 may be fastened to each other through a fastening member such as a screw.

The pair of link supporters 21 and 22 may each have a through hole through which the hinge pin P4 rotatably passes, and a hinge pin supporter, such as a bearing, to support the hinge pin P4 may be disposed at the through hole.

When the second link 72 is rotated about the hinge pin P4, the second link 72 may be rotated vertically or substantially vertically. The hinge pin P4 may rotatably couple the lower portion of the second link 72 to the link supporters 21 and 22.

The first link 71 and the second link 72 may be folded or unfolded while being coupled to the link joint 73. When the second link 72 is rotated horizontally or substantially horizontally with respect to the housing 1, the first link 71 is laid down horizontally or substantially horizontally while being coupled to the link joint 73, which is similar to the second link 72. To the contrast, when the second link 72 is rotated vertically or substantially vertically with respect to the housing 1, the first link 71 becomes upright on the second link 72 to be vertical or substantially vertical together the second link 72.

The display device may further include a control module 98 to control the driving mechanism 10. The control module 98 may be received in the space S of the housing 1 and may be protected by the housing 1. The control module 98 may include a main board having a circuit unit to control the driving mechanism 10.

The control module 98 may control a driving source 81 of the driving mechanism 10. When the control module 98 drives the driving source 81 of the driving mechanism 10, the second link 72 and the first link 71 may be rotated, and the display module 2 may be unwound from the roller 5 or wound around the roller 5, as the first link 71 rotates.

Meanwhile, preferably, the first link 71 and the second link 72 has a substantially light weight and higher stiffness. At least one of the first link 71 or the second link 72 may include an arm and a gear, and may further include a fastening member to couple the arm and the gear. The load of the display module 2 may be applied to the gear constituting the first link 71 or the second link 72, and the gear preferably has higher stiffness to precisely control the position of the display module 2 (that is, the position of the second coupling part 2B). Accordingly, the gear needs to have higher stiffness. For example, the gear may be formed of a metal material, such as high stiffness steel, aluminum alloy, or stainless steel, or may be formed of a synthetic resin material such as engineering plastics which is a plastic material including a polymer material.

When the gear includes a metal material, the gear may be an aluminum alloy, such as AL 6063, or stainless steel such as SUS 304. Preferably, the gear may include a material, such as SUS 304, allowing a minimized gear thickness, and higher Young's modulus (Gpa), and higher tensile strength (Mpa). The arm constituting the first link 71 or the second link 72 may be different from the gear, in material, and may include an aluminum alloy, such as AL 6063.

As described above, when the arm is different from the gear in material, for example, when the arm includes an aluminum alloy, such as AL6063, and the gear includes stainless steel such as SUS 304, a portion of the link, to which a gear coupling part 102 and the gear are coupled, may have higher stiffness, as compared to that of the link totally including an aluminum alloy such as AL 6063.

When the link includes an arm formed of an aluminum alloy such as AL 6063 and a gear formed of stainless steel, such as SUS 304, and the gear thickness is 4 mm, a portion of the link, to which the gear coupling part 102 and the gear are coupled, may have higher stiffness, as compared to the stiffness of the gear when the link is formed of an aluminum alloy such as AL 6063 and the gear thickness is 10 mm.

The first link 71 may include a first arm 74 and a first gear 75, and the first arm 74 and the first gear 75 may be fastened to each other through a fastening member. The second link 72 may include a second arm 76 and a second gear 77, and the second arm 76 and the second gear 77 may be fastened to each other through a fastening member.

FIG. 6 is a perspective view of the display module while the lift module moves up the display module according to an embodiment of the present disclosure.

The first link 74 may be coupled to the connecting bar 60 or the upper bracket 49 through a hinge pin P1.

The first arm 74 and the first gear 75 may be coupled to the link joint 73 through the hinge pin P2.

The first arm 76 and the second gear 77 may be coupled to an arm joint 23 through the hinge pin P3.

The second arm 76 may be coupled to the housing 1 or the link supporters 21 and 22 disposed inside the housing 1 through the hinge pin P4.

The first gear 75 may be a driven gear rotated by the second gear 77 when the second gear 77 rotates. The first gear 75 may be rotated about the display module 2 together with the first arm 74, so the first link 71 may be rotated about the display module 2.

The second gear 77 may be toothed with the first gear 75, and may be a driving gear that rotates the first gear 75 when the second arm 76 rotates. When the second arm 72 is rotated, the second gear 77 may be rotated about the hinge pin P4 together with the second arm 72, and may rotate the first gear 75 while being toothed with the first gear 75.

The driving mechanism 10 may include a rotating mechanism 80 coupling to a link assembly L to rotate the link assembly L. The rotating mechanism 80 may be coupled to the second link 72 to rotate the second link 72.

The rotating mechanism 80 may include a driving source, such as a motor, and at least one power transfer member to transfer driving force of the driving source to the second link 72.

The first link 71, the second link 72, the link joint 73, and the rotating mechanism 80 may constitute the driving mechanism 10 to move the position of the second coupling part 2B of the display module 2.

The first link 71, the second link 72, and the link joint 73 may constitute the link assembly L coupled to the display module 2, and the link assembly L is linked to the rotating mechanism 80 to move the second coupling part 2B of the display module 2.

The display device may include a plurality of link assemblies L, which are assemblies of the first link 71, the second link 72, and the link joint 73.

The plurality of link assemblies may operate the display module 2 together while being spaced apart from each other in the direction Y perpendicular to the direction z in which the display module 2 is spread. The rotating mechanism 80 may be coupled to each of the plurality of link assemblies, and may operate the plurality of link assemblies together.

The plurality of link assemblies may include a pair of link assemblies L1 and L2, and the pair of link assemblies L1 and L2 may include a left link assembly L1 and a right link assembly L2. The left link assembly L1 and the right link assembly L2 may be spaced apart from each other in the left and right directions, and may be symmetrically disposed in the left-right direction.

When the display device includes both the left link assembly L1 and the right link assembly L2, the first link 71 of the left link assembly L1 may be coupled to a left upper bracket 49A mounted on the connecting bar 60 through the hinge pin P1, and the first link 71 of the right link assembly L2 may be coupled to a right upper bracket 49B mounted on the connecting bar 60 through the hinge pin P1.

The rotating mechanism 80 may be coupled to the second link 72, and may rotate the second link 72 about the hinge pin P4. The second link 72 may be formed at a coupling part 79 to which the rotating mechanism 80 is coupled. The coupling part 79 may be formed between the hinge pin P4 and the second gear 77 of the second link 72.

The rotating mechanism 80 may push or pull the second link 72 while being coupled to the coupling part 79, and the second link 72 may be rotated about the hinge pin P4 when pushed or pulled by the rotation mechanism 80. When the rotating mechanism 80 pushes the coupling part 79, the second link 72 may be rotated in any one direction (for example, a clockwise direction) of a clockwise direction and a counterclockwise direction around the hinge pin P4 and may be upright. To the contrary, when the rotating mechanism 80 pulls the coupling part 79, the second link 72 may be rotated about the hinge pin P4 in any another direction (for example, the counterclockwise direction) of the clockwise direction and the counterclockwise direction and be laid down.

The rotating mechanism 80 may include at least one motor 81, a lead screw 84 rotated by the motor 81, a slider 86 sliding along the lead screw 84 when the lead screw 84 is rotating, and a connecting rod 87 coupled to the slider 86 and the second link 72 to push or pull the second link 72 while the slider 86 slides.

When the rotating mechanism 80 rotates the pair of link assemblies L1 and L2 together, the rotating mechanism 80 includes at least one motor 81 and a pair of lead screws 84, a pair of sliders 86, and a pair of connecting rods 87. When the display device includes a pair of link assemblies L1 and L2, the lead screws 84, the sliders 86, and the connecting rods 87 are symmetrical left and right about the motor 81.

The motor 81 may be installed in the lift module supporter 15. The motor 81 may be a BLDC motor.

Driving shafts of the motor 81 may be disposed at opposite sides of the motor 81. The right driving shaft and the left driving shaft of the motor 81 may rotate in the same direction. Alternatively, the right driving shaft and the left driving shaft of the motor assembly 81 may rotate in opposite directions.

The lead screw 84 may be coupled to the driving shaft of the motor 81 through a coupling 82.

The lead screw 84 may be disposed to pass through the slider 86. A thread may be formed on the outer periphery of the lead screw 84.

The rotating mechanism 80 may further include at least one bearing 83 or 85 to support the lead screw 84. Bearings 83 and 85 to support the lead screw 84 may be mounted on the lift module supporter 15. The lead screw 84 may be rotatably supported by the pair of bearings 83 and 85. The pair of bearings 83 and 85 may be spaced apart from each other in the longitudinal direction of the lead screw 84.

A hollow part, through which the lead screw 84 passes, may be formed in the slider 86. The hollow part of the slider 86 may have a thread engaged with the thread of the lead screw, and the thread may linearly move in the longitudinal direction of the lead screw 84 along the lead screw 84, when the lead screw 84 is rotated.

The rotating mechanism 80 may further include a spring 88 to elastically support the slider 86. The length of the spring 88 may be shorter than the length of the lead screw 84. The spring 88 may be interposed between the bearing 83 and the slider 86. The spring 84 may be interposed between the bearing, which is closer to the motor 81 of the pair of bearings 83 and 85, and the slider 86. The spring 88 may be disposed to surround an outer circumference of a portion of the lead screw 84. One end of the spring 88 may be coupled to the bearing 83, and an opposite end of the spring 88 may be separated from or in contact with the slider 86.

The spring 88 may be compressed through the pressing of the slider 86 when the second link 72 is laid down horizontally. When the second link 72 starts to be upright, the second link 72 is recovered to an original status thereof while pressing the slider 86 in a direction opposite to a direction of the motor 81.

As described above, when the restoring force of the spring 88 acts on the slider 86, the initial load of the motor 81 may be reduced, when the motor 81 to erect the second link 72 is initially started.

The connecting rod 87 may include a slider connecting portion coupling to the slider 86 through a hinge pin, and a second link connecting portion coupled to the coupling part 79 of the second link 72 through a hinge pin.

The slider connecting portion may be formed on one side of the connecting rod 87 in the longitudinal direction of the connecting rod 87, and the second link connecting portion may be formed on an opposite side of the connecting rod 87 in the longitudinal direction of the connecting rod 87.

When the slider 86 approaches the motor 81, the connecting rod 87 may be pulled by the slider 86 to move the second link 72 downward, and the second link 72 may be laid down while rotating about the link supporters 21 and 22 in a direction closer to the motor 81.

Meanwhile, when the slider 86 is away from the motor 81, the connecting rod 87 may be pushed by the slider 86 to move the first link 71 upward, and the second link 72 may be upright while rotating about the link supporters 21 and 22 in a direction away from the motor 81.

FIG. 7 is a rear view illustrating an inner part of a link joint as one example of a link assembly according to an embodiment of the present disclosure, FIG. 8 is an exploded perspective view illustrating a first link or a second link illustrated in FIG. 7, FIG. 9 is a front view of a gear illustrated in FIG. 8, and FIG. 10 is a sectional view taken along line A-A' illustrated in FIG. 7.

Hereinafter, a link assembly will be described.

The first link 71 and the second link 72 may include an arm and a gear in common. Hereinafter, the common configuration of the first link 71 and the second link 72 will be referred to as a link, the common configuration of the first arm 74 and the second arm 76 will be referred to as an arm, and the common configuration of the first gear 75 and the second gear 77 will be referred to as a gear, for explanation.

At least one gear coupling part 102 may protrude from the arm. The arm may include an arm body 101 extending in the longitudinal direction of the link, and the gear coupling part 102 protruding from the arm body 101.

The gear coupling part 102 may be formed to be thinner than the arm body 101. The gear may be formed to be thinner than the arm body 101.

The arm body 101 may have the thickness T1 (hereinafter, referred to as a "first thickness") thinner than the thickness T2 (hereinafter, referred to as a "second thickness") of the gear coupling part 102 or thicker than the thickness "T3" (hereinafter, referred to as a "third thickness") of the gear.

When the gear coupling part 102 includes portions 104 and 106 having different thicknesses, the second thickness T2 is defined as the thickness of the thickest portion of the parts 104 and 106 having different thicknesses or may be defined as the average thickness of the portions 104 and 106 having different thicknesses of the gear coupling part 102.

Meanwhile, when the gear includes parts 114 and 116 having different thicknesses, the third thickness T3 is defined as the thickness of the thickest portion of the parts 114 and 116 having different thicknesses or may be defined as the average thickness of the portions 114 and 116 having different thicknesses.

The first thickness T1 may be greater than or equal to the sum (T2+T3) of the second thickness T2 and the third thickness T3.

The gear coupling part 102 may include a first coupling part 104 and a second coupling part 106.

The thickness T21 of the first coupling part 104 may be thicker than the thickness T22 of the second coupling part 106.

The first coupling part 104 may include a stop surface 108 to which the second gear part 116 is locked in a rotational direction thereof. One end 109 of the stop surface 108 may be make contact with one surface, which faces the second gear part 116 of the gear to be described, of the second coupling part 106.

The second coupling part 106 may extend from the first coupling part 104 and may be thinner than the first coupling part 104.

A pin through hole, through which the hinge pins P2 and P3 pass, may be formed in the gear coupling part 102.

The gear coupling part 102 may be coupled to the gear using a fastening member 120, such as a screw or a pin, and at least one first fastening hole 105 or 107 is formed in the gear coupling part 102.

The first fastening holes 105 are 107 may be formed in each of the first coupling part 104 and the second coupling part 106, respectively. The first coupling part 104 may include a first coupling part fastening hole 105 to fasten the first coupling part 104 to the gear through a fastening member, and the second coupling part 106 may include a second coupling part fastening hole 109 to fasten the second coupling part 106 to the gear through a fastening member. The first fastening holes 105 are 107 may be formed between the pin through hole and the gear coupling part 102. A plurality of first fastening holes 105 are 107 may be formed. A plurality of first fastening holes 105 are 107 may be formed in each of the first coupling part 104 and the second coupling part 106. The first fastening holes 105 and 107 may be spaced apart from the stop surface 108.

The gear may include a first gear part 114 and a second gear part 116.

The first gear part 114 may face the first coupling part 104, and may be coupled to the first coupling part 104 through the fastening member 120.

The second gear part 116 may face the second coupling part 106, and may be coupled to the second coupling part 106 through the fastening member 120. The second gear part 116 may be thicker than the first gear part 114.

The fastening member 120 may fasten the gear to the gear coupling part 102. The first fastening holes may be formed in the gear coupling part 102, and the second fastening holes 115 and 117 matched with the first fastening holes may be formed in the gear. In addition, fastening members 120 may be inserted into the first fastening holes 105 and 107 and the second fastening holes 115 and 117 such that the gear is fastened to the gear coupling part 102.

The second fastening holes 115 are 117 may be formed in each of the first gear part 114 and the second gear part 116, respectively. The first gear part 114 may include a first gear part fastening hole 115 to be fastened to the first coupling part 104 through a fastening member, and the second gear part 116 may include a second gear part fastening hole 117 to be fastened to the second coupling part 106 through a fastening member 200.

The gear may be restricted to the gear coupling par 102 in both the clockwise direction and the counterclockwise direction by the stop surface 108, and may be restricted by the fastening member 120 in the four directions of up, down, left, and right directions. In other words, the gear may be firmly and reliably fixed to the gear coupling part 102.

FIG. 11 is a rear view illustrating the inner part of a link joint as another example of a link assembly according to an embodiment of the present disclosure, FIG. 12 is a perspective view illustrating a first link or a second link illustrated in FIG. 11, and FIG. 13 is an exploded perspective view of a first link or a second link illustrated in FIG. 12.

In the link assembly illustrated in FIG. 11, at least one of the pair links 71 and 72 may include an arm, a gear, and at least one fastening member, which is similar to the link assembly illustrated in FIGS. 7 to 10.

Hereinafter, the duplicated description of common components of the link assembly illustrated in FIGS. 7 to 10 will be omitted, and different components will be described.

A pair of gear coupling parts may be formed in the arm. The pair of gear coupling parts 104' and 106' may be spaced apart from each other. A portion of the gear may be inserted and received between the pair of gear coupling parts 104' and 106'. A gap G may be formed.

A fastening member my include any one of the pair of gear coupling parts and a shaft 130 press-fitted into the gear and coupled to the gear.

A first fastening hole 105' may be formed in any one coupling part 104' of the pair of gear coupling parts 104' and 106'. The gear may include a second fastening hole 115' matched with the first fastening hole 105'.

The shaft 130 may be press-fitted into the first fastening hole 105' and the second fastening hole 115', and may be coupled to any one coupling part 104' of the gear coupling parts 104' and 106'.

The shaft 130 may extend in the direction Y in which the pair of gear coupling parts 104' and 106' are spaced apart from each other.

The fastening member may further include a pin 140.

The pin 140 may be press-fitted between the gear and a remaining one coupling part 106' of the pair of gear coupling parts 104' and 106'.

The shaft 140 may extend in the direction X perpendicular to the direction Y in which the pair of gear coupling parts 104' and 106' are spaced apart from each other.

The gear may include a first gear part 114' and a second gear part 116'.

The first gear part 114' may be smaller than the second gear part 116'. The first gear part 114' may be spaced apart from the second gear part 116' in the circumferential direction. A recession part may be formed between the first gear part 114' and the second gear part 116' such that the gear coupling part is inserted into the recession part.

The diameter of the gear may be longer than the length of the gap G formed between the pair of gear coupling parts 104'. In the gear, a gear part, which has a shorter length, of the first gear part 114' and the second gear part 116' may be inserted into the gap G.

A first recession part may be formed between one end of the second gear part 116' in a circumferential direction, and the first gear part 114', such that any one 104' of the pair of gear coupling parts 104' and 106' is inserted into and makes contact with the first recession part.

A second recession part may be formed between an opposite end of the second gear part 116' in the circumferential direction, and the first gear part 114', such that another coupling part 106' of the pair of gear coupling parts 106' and 106' is inserted into and makes contact with the second recession part.

The first recession part and the second recession part may be formed to be recessed in a radial direction in a portion of the outer circumferential portion of a spur gear.

The gear may have the second gear part 116', the first recession part, the first gear part 114', the second recession part, and the second gear part 116' in the circumferential direction.

A gear tooth may be formed in each of the first gear part 114' and the second gear part 116'.

The first gear part 114' of the gear may not be toothed with another gear substantially close thereto, and the second gear part 116' of the gear may be toothed to the another gear.

The second gear part 116' is a component positioned outside the pair of gear coupling parts 104' and 106', and may be toothed with another gear adjacent thereto.

The first gear part 104' may be inserted and received into the gap G, and may have a second fastening hole 115' that is matched with the first fastening hole 105'.

The second gear part 106' may be integrally formed with the first gear part 104' and positioned outside the gap G.

Another 106' of the pair of gear coupling parts 104' and 106' and the first gear part 114' have grooves 117A and 117B formed corresponding to each other to form a pin hole, and a pin 140 may be press-fitted into the pin hole 117.

The pin 140 may extend in the direction X perpendicular to the direction Y in which the pair of gear coupling parts 104' and 106' are spaced apart from each other.

Hereinafter, a gear coupling part having the first fastening hole 105' will be referred to as the first gear coupling part 104', a gear coupling part having the pin groove 117B will be referred to as the second gear coupling part 106', the direction in which the pair of gear coupling parts 104' and 106' are spaced apart from each other will be referred to as the first direction Y, and the direction perpendicular to the first direction Y will be referred to as the second direction X, for explanation.

The shaft 130 may be press-fitted in the first direction Y from the side of the first gear coupling part 104'.

The pin 140 may be press-fitted in the second direction X from the rear portion of the second gear coupling part 106' and the first gear part 114'.

The shaft 130 and the pin 140 may be press-fitted in different directions X and Y, and the first gear 114' and may more securely fixed to the first and second gear coupling parts 104' and 106' without being distorted in the first direction Y and the second direction X.

When the shaft 130 fixes the first gear 114' to the first gear coupling part 104', and the pin 140 is absent, the gear may be fixed to the arm in the longitudinal direction Y of the shaft 130, and may rotate about the shaft 130.

When the pin 140 is press-fitted between the first gear 114' and the second gear coupling part 104' in the state that the shaft 130 fixes the first gear 114' to the first gear coupling part 104', the gear is restricted to the pin 140 to prevented from being rotated about the shaft 130, and securely fixed to the first gear coupling part 104' and the second gear coupling part 106'.

Meanwhile, when the pin 140 is press-fitted between the first gear 114' and the second gear coupling part 104', and the shaft 130 is absent, the gear may be restricted from being rotated about the pin 140, but may linearly move in the longitudinal direction X of the pin 140.

When the shaft 130 is press-fitted between the first gear coupling part 104' and the first gear part 114', in the state that the pin 140 is press-fitted between the first gear 114' and the second gear coupling part 104', the gear may be restricted by the shaft 130 in the longitudinal direction X of the pin 140, and the gear may be securely fixed to each of the first gear coupling part 104' and the second gear coupling part 106'.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

What is claimed is:

1. A display device comprising:
a display module;
a link assembly coupled to the display module; and
a rotating mechanism coupled to the link assembly and configured to rotate the link assembly,
wherein the link assembly includes:
a pair of links; and
a link joint to which each of the pair is rotatably coupled,
wherein at least one of the pair of links includes:
an arm having at least one gear coupling part,
a gear; and
a fastening member to couple the gear coupling part,
wherein a first fastening hole is formed in the gear coupling part and a second fastening hole corresponding to the first fastening hole is formed in the gear,
wherein the at least one gear coupling part comprises a pair of gear coupling parts separated by a gap,
wherein the first fastening hole is formed in a first gear coupling part of the pair of gear coupling parts,
wherein the gear includes:
a first gear part received in the gap and having a second fastening hole corresponding to the first fastening hole, and
a second gear part formed integrally with the first gear part and positioned outside the gap,
wherein a first groove is formed in a second gear coupling part of the pair of gear coupling parts and a second groove is formed in the first gear part corresponding to the first groove, such that the first and second grooves form a pin hole when positioned to face each other,
wherein the fastening member includes a pin inserted into the pin hole, and
wherein the pin extends perpendicular to a direction in which the pair of gear coupling parts are spaced apart from each other.

2. A display device comprising:
a display module;
a link assembly coupled to the display module; and
a rotating mechanism coupled to the link assembly and configured to rotate the link assembly,
wherein the link assembly includes:
a pair of links; and
a link joint to which each of the pair of links is rotatably coupled,
wherein at least one of the pair of links includes:
an arm having at least one gear coupling part;
a gear; and
a fastening member to couple the gear to the gear coupling part,
wherein a first fastening hole is formed in the gear coupling part,
wherein a second fastening hole corresponding to the first fastening hole is formed in the gear,
wherein the at least one gear coupling part comprises a pair of coupling parts separated by a gap,
wherein the fastening members comprises two shafts configured to secure the gear to the pair of coupling parts, and
wherein the two shafts are positioned perpendicular to each other to secure the gear to the pair of coupling parts.

3. The display device claim 2, wherein the fastening member includes a shaft inserted into the first fastening hole and the second fastening hole.

4. The display device of claim 3, wherein the shaft extends in a direction in which the pair of gear coupling parts are spaced apart from each other.

* * * * *